United States Patent
Reich et al.

[11] Patent Number: 5,938,927
[45] Date of Patent: Aug. 17, 1999

[54] PROCESS FOR EXTRACTING OIL FROM CONTAMINATED FILTER MEDIA

[75] Inventors: Ronald A. Reich, Pittsburgh; Ronald P. Festa, New Kensington; Mark L. Weaver, Pittsburgh, all of Pa.

[73] Assignee: Aluminum Company of America, Pittsburgh, Pa.

[21] Appl. No.: 08/889,381

[22] Filed: Jul. 8, 1997

Related U.S. Application Data

[63] Continuation-in-part of application No. 08/724,557, Sep. 30, 1996, abandoned.

[51] Int. Cl.[6] ..................................................... B01D 11/02
[52] U.S. Cl. ................... 210/634; 210/791; 210/797; 208/428; 502/20; 502/22; 502/28
[58] Field of Search ....................... 210/634, 670, 210/673, 674, 791, 792, 794, 797, 798; 208/426, 428, 433, 435; 502/20, 22, 27, 28

[56] References Cited

U.S. PATENT DOCUMENTS

| | | | |
|---|---|---|---|
| 1,571,074 | 1/1926 | Thatcher | 502/25 |
| 3,724,177 | 4/1973 | Grote | 210/484 |
| 4,061,566 | 12/1977 | Modell | 210/673 |
| 4,104,163 | 8/1978 | Grutsch | 210/794 |
| 4,124,528 | 11/1978 | Modell | 210/670 |
| 4,147,624 | 4/1979 | Modell | 210/32 |
| 4,448,669 | 5/1984 | Scinta | 208/415 |
| 4,571,294 | 2/1986 | Friedman et al. | 208/11 |
| 4,741,806 | 5/1988 | Scinta | 196/14.52 |
| 4,824,570 | 4/1989 | Bethuel | 210/511 |
| 4,888,316 | 12/1989 | Gardner | 502/20 |
| 5,151,188 | 9/1992 | Hopper | 210/634 |
| 5,198,115 | 3/1993 | Stallinj | 210/634 |
| 5,290,959 | 3/1994 | Rice | 554/11 |
| 5,345,029 | 9/1994 | Schubert | 585/825 |
| 5,571,403 | 11/1996 | Scott et al. | 208/428 |
| 5,599,376 | 2/1997 | Camp | 210/634 |

*Primary Examiner*—Ernest G. Therkorn
*Attorney, Agent, or Firm*—Glenn E. Klepac

[57] ABSTRACT

Oil and oil additives separated from a contaminated solid particulate filter medium, preferably diatomaceous earth particles. Portions of a mixture of oil, oil additives and the filter medium are compressed into pellets that are extracted with liquid or supercritical $CO_2$ to form a liquid solution. The solution is separated from the pellets and then heated to 20°–60° C. at a superatmospheric pressure to drive off $CO_2$ gas, which is preferably recycled by compression into liquid or supercritical $CO_2$.

17 Claims, 1 Drawing Sheet

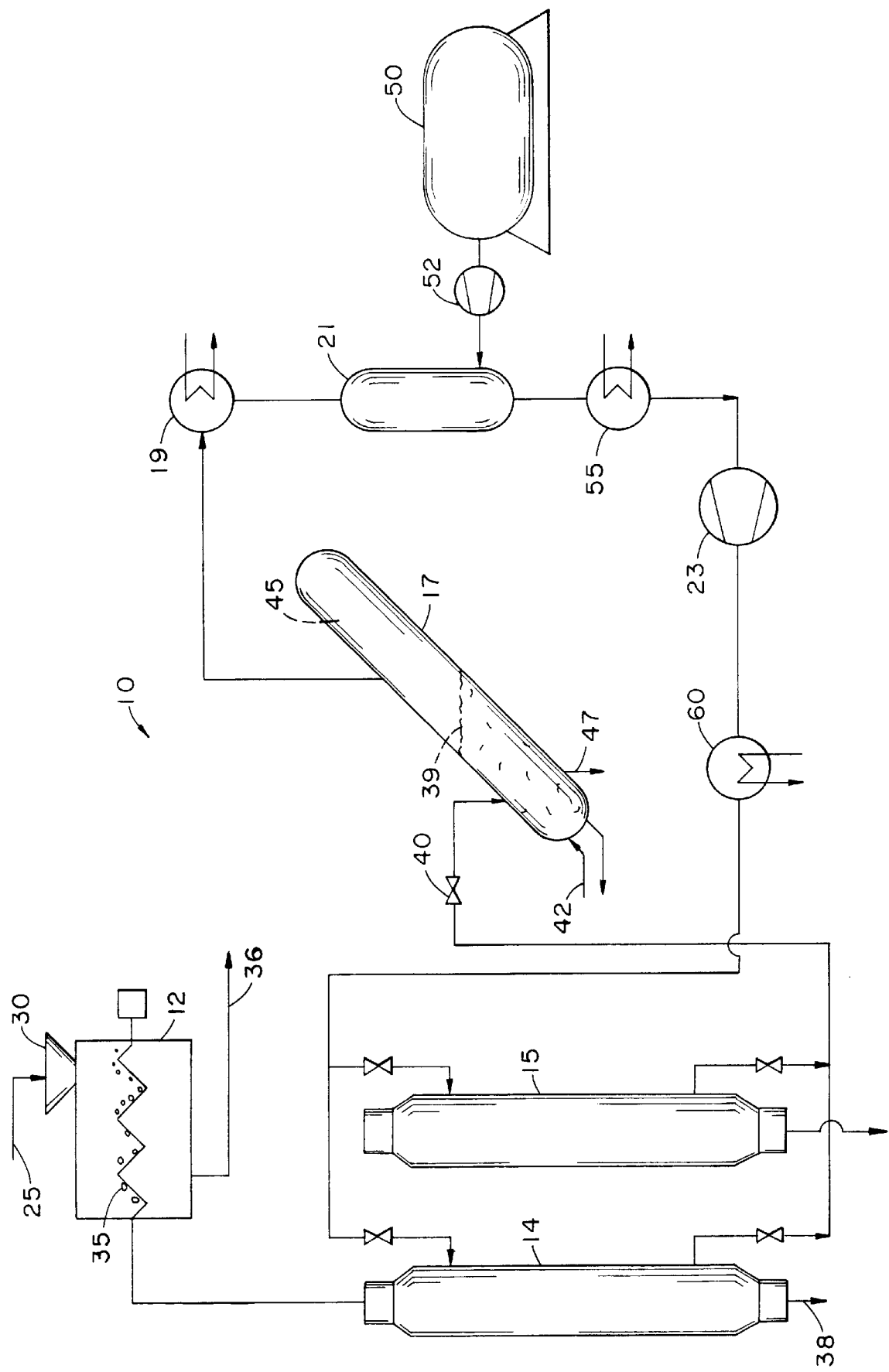

PROCESS FOR EXTRACTING OIL FROM CONTAMINATED FILTER MEDIA

CROSS REFERENCE TO RELATED APPLICATION

This application is a continuation-in-part of our application, U.S. Ser. No. 08/724,557, filed Sep. 30, 1996, now abandoned.

FIELD OF THE INVENTION

The present invention relates to a process for extracting oil from solid particulate filter media. The process is especially useful for separating used rolling oil from porous filter media such as diatomaceous earth particles.

BACKGROUND OF THE INVENTION

Metalworking lubricants are widely used in the aluminum industry for reducing the thickness of sheet metal in rolling mills. These lubricants are usually emulsions wherein a small quantity of oil is admixed with a larger volume of water. The lubricants lubricate an interface between the rolls and sheet metal, and they cool the metal as it passes between the rolls. After prolonged use, the oil in these systems becomes contaminated with finely divided metal particles, metal oxide particles, and other extraneous matter such as mill dirt. These contaminants decrease process efficiency, reduce the activity of the oil as a lubricant and eventually lead to smudging and other surface defects in the product.

When the lubricant is contaminated, its usefulness is reduced because of the difficulty of emulsification and because the metal contaminants and other suspended materials furnish a source of an undesired abrasive. Accordingly, it is desirable to remove solid contaminants from the lubricants so that they can be reused.

In both ferrous and non-ferrous metalworking operations, filtration systems are customarily established for reclaiming hydrocarbon oils from used lubricants. In these systems, the oil is separated from water and then the oil is filtered through a particulate filter medium. Some suitable filter media include calcined diatomaceous earth, sand and wood pulp. Diatomaceous earth is particularly preferred. The diatomaceous earth has an average particle size in the range of about 1–30 microns.

In the prior art, used diatomaceous earth has typically been discarded after being used to filter lubricant oils. However, the discarded diatomaceous earth poses a potential environmental hazard because of its residual oil content. Accordingly, there is a need for a process capable of reclaiming residual oil from used diatomaceous earth rather than discarding the oil together with the diatomaceous earth.

Lubricant compositions used in aluminum rolling mills generally contain mineral or synthetic oil together with various oil additives. The oil additives are generally organic compounds such as ethanolamines, carboxylic acids, alcohols and esters. One important advantage of the present invention is that our process will recover these additives together with the mineral or synthetic oil.

Another important advantage of the present invention is that our process avoids extracting the used filter medium with hydrocarbon solvents such as benzene, toluene, methanol and tetrahydrofuran. These solvents pose serious health, safety and environmental hazards and they dilute oil recovered from the process unless considerable energy is devoted to distilling them off.

A principal objective of the invention is to provide an efficient and economical process for extracting oil from oil-contaminated solid particulate filter media.

A related objective of the invention is to provide a process for extracting oil from oil-contaminated filter media wherein the process avoids using organic solvents such as benzene, toluene, methanol and tetrahydrofuran. Prior art processes relying upon such organic solvents inevitably release harmful pollutants into the environment and pose serious health hazards to persons inhaling or ingesting them.

Additional objectives and advantages of our invention will become readily apparent to persons skilled in the art from the following detailed description.

SUMMARY OF THE INVENTION

In accordance with the present invention, there is provided a process for extracting oil from a mixture that includes oil, at least one oil additive, a solid particulate filter medium, and usually also some water. The process is especially useful for separating used rolling oil from diatomaceous earth particles. The mixture may also contain finely divided metal particles, metal oxide particles and other solid matter such as dirt.

Some oil additives that may be included in the mixture are carboxylic acids, alkanolamines, esters and alcohols. The carboxylic acids are $C_8$–$C_{40}$ mono- or di-carboxylic acids. Oleic acid, isostearic acid and lauric acid are suitable monocarboxylic acids and dimerized linoleic acid is a suitable dicarboxylic acid. Some preferred alkanolamines are triethanolamine, diethanolamine and ethyldiisopropylamine. The esters may be $C_1$–$C_8$ alkyl esters of $C_{10}$–$C_{40}$ mono- or di-carboxylic acids. One suitable ester is ethyl laurate. The alcohols may be $C_{10}$–$C_{40}$ alcohols and are preferably $C_{10}$–$C_{20}$ alkyl alcohols. One example is lauryl alcohol.

Portions of the mixture are compressed in a pelletizer to form discrete pellets having an average sieve size of less than one inch, preferably about ½ to ¾ inch. Squeezing the mixture in the pelletizer removes some oil and water from the pellets.

The pellets are transferred to an extraction vessel where liquid or supercritical $CO_2$ flows around them. The extraction vessel is preferably maintained at a temperature greater than about 20° C. and a pressure greater than about 3000 psi. More preferably, the temperature is greater than about 30° C. and the pressure is greater than about 4000 psi. Optimally, temperature in the extraction vessel is about 40° C. and pressure is about 4500 psi. At that temperature and pressure, $CO_2$ is a supercritical fluid and the oil solubility in $CO_2$ is about 1.65 wt. %. Accordingly, the volume of $CO_2$ supplied to the extraction vessel must be at least about 30 times the volume of oil to be extracted from the pellets. More preferably, the volume of $CO_2$ is about 50–100 times the oil volume.

The extraction step produces de-oiled diatomaceous earth pellets and a liquid solution containing $CO_2$, oil and water. The solution is transferred through an expansion valve to an evaporator maintained at a lower pressure than the extraction vessel. The evaporation pressure is preferably greater than atmospheric pressure and less than about 1000 psi. The evaporator is heated to maintain a temperature of about 20°–60° C., preferably about 20°–40° C. and more preferably about 20°–30° C. A particularly preferred evaporator temperature is about 25° C. with a pressure of about 500–1000 psi.

In the evaporator, $CO_2$ gas is liberated and removed. The residue is mostly oil and oil additives. The liberated $CO_2$ gas is removed and then condensed, cooled and compressed to form liquid $CO_2$. The liquid $CO_2$ is preferably heated before it is recycled to the extraction vessel for extracting oil from diatomaceous earth pellets.

BRIEF DESCRIPTION OF THE DRAWING

The sole FIGURE is a schematic illustration of the process of the present invention.

DETAILED DESCRIPTION OF A PREFERRED EMBODIMENT

A particularly preferred extraction apparatus for carrying out the process of the present invention is shown in the FIGURE. The extraction apparatus 10 includes a pelletizer 12, two extractors or extraction vessels 14, 15, an evaporator 17, a condenser 19, a $CO_2$ supply tank 21 and a $CO_2$ pump 23.

A mixture 25 of diatomaceous earth, oil, water and various solid impurities is fed into the pelletizer 12 through a hopper 30. Solid impurities accumulate in the diatomaceous earth as it filters rolling oil used as a lubricant in mills for reducing the thickness of aluminum alloy sheet material. The solid impurities include finely divided metal particles, metal oxide particles and mill dirt.

The pelletizer 12 produces solid pellets 35 having an average sieve size of about 2¾ inch. Compressing the pellets 35 in the pelletizer 12 removes some oil and water 36 from them.

The pellets 35 are fed into am extraction vessel 14 where they are mixed with liquid or supercritical $CO_2$. In the preferred embodiment shown, the extraction fluid is supercritical $CO_2$ maintained at a temperature of about 40° C. and a pressure of about 4500 psi (31 MPa). Under those conditions, the solubility of oil in $CO_2$ is about 1.65 wt. %. Accordingly, the volume of $CO_2$ supplied to the vessel 14 is usually about 50–100 times the volume of oil to be extracted from the pellets.

The extraction vessels 14, 15 each have a volume of about 200 liters, and they are made from stainless steel to resist carbonic acid, which has a pH of about 3–5. The extractors 14, 15 are generally unjacketed and uninsulated under normal process temperatures of about 25–40° F.

The extractors 14, 15 are designed to have a two-hour cycle time. That is, each extractor will be emptied and refilled with diatomaceous earth pellets and $CO_2$ in a two-hour period.

The extraction step produces de-oiled diatomaceous earth 38 which is either discarded or recycled after an appropriate chemical treatment to remove impurities. A liquid solution 39 containing $CO_2$, oil and water is transferred through an expansion valve 40 to an evaporator 17. The evaporator 17 is heated by steam 42 to maintain a temperature of about 25° C. and a pressure of about 900 psi (6.2 MPa). The evaporator 17 yields $CO_2$ gas 45 and a liquid residue 47 which is mostly oil together with some oil additives.

The $CO_2$ gas may be vented or removed to a condenser 19 where it is liquefied and then sent to a $CO_2$ supply tank 21 which is maintained at about 900 psi (6.2 MPa). A liquid $CO_2$ storage tank 50 and a liquid $CO_2$ pump 52 also send $CO_2$ to the supply tank 21, as needed. The storage tank 50 is maintained at a pressure of about 300 psi (2.1 MPa).

Liquid $CO_2$ from the supply tank 21 is recycled to the extraction vessels 14, 15 through a precooler 55, a liquid $CO_2$ pump 23 and a preheater 60. The pump 23 and preheater 60, in combination, supply $CO_2$ to the extractors 14, 15 at about 40° C. and 4500 psi (31 MPa).

We performed a test demonstrating the ability of our process to extract oil from diatomaceous earth. The feed material was 24.3 wt. % mineral oil, 23.8 wt. % water and 51.9 wt. % diatomaceous earth. The feed material was compressed into lumps or pellets having a diameter of approximately ½–¾ inch.

A 3812 g load of the lumps was placed in an extractor having a 4.6 inch inside diameter. The packing depth was about 24 inches and bulk density was 0.69 g/cm³. The extractor was maintained at a temperature of about 25–26° C. and pressure of about 3000 psi (20.7 MPa). A 730 g/min. upward flow of $CO_2$ was maintained through the lumps for 197 minutes. Analysis of the lumps for oil and water showed the following results.

| Analysis of Pellets for Oil and Water | | |
|---|---|---|
| Material | Oil (wt. %) | Water (wt. %) |
| Feed | 24.3 | 23.8 |
| Bed, bottom | 2.5 | 5.1 |
| Bed, middle | 14.1 | 6.4 |
| Bed, top | 18.7 | 13.0 |

The total extract weight after evaporation of $CO_2$ was 21.3% of the feed weight. About ⅛ by volume of the extract was water. The extraction rate remained constant during the run and corresponded to about 4.5–6.4 mg extract/g $CO_2$. For the first 120 minutes, the extract was entirely oil. Toward the end of the run, the proportion of water in the extract gradually increased. The lumps were still wet with oil and water after the extraction, even at the bottom of the bed where oil and water contents were lowest.

Two examples of lubricant compositions that may be recovered from mixtures with solid particulate filter media are as follows:

| Lubricant Compositions | | |
|---|---|---|
| | Amount (wt. %) | |
| Ingredient | No. 1 | No. 2 |
| Oil | 77.5 | 56 |
| Fatty Acid | 2.5 | 10 |
| Ester | 18 | 30 |
| Soap | 2 | 4 |

One advantage of our invention is that the fatty acid and ester components of such compositions are recovered along with the oil. Accordingly, the recovered oil additives are recycled for reuse as rolling oil lubricants.

The invention has been described above in terms of some particularly preferred embodiments. Persons skilled in the art will understand that numerous changes and modifications can be made therein without departing from the spirit and scope of the following claims.

What is claimed is:

1. A process for separating oil from a mixture comprising oil, at least one oil additive and a solid particulate filter medium, comprising:
    (a) extracting said mixture with liquid or supercritical $CO_2$ to form a liquid solution comprising oil, at least one oil additive and liquid or supercritical $CO_2$;
    (b) separating said liquid solution from said solid particulate filter medium; and
    (c) heating said liquid solution to a temperature of about 20°–60° C. at a pressure of about atmospheric pressure or greater, thereby to evaporate $CO_2$ gas from a product comprising oil and at least one oil additive.

2. The process of claim 1 wherein said additive is selected from the group consisting of alkanolamines, $C_8$–$C_{40}$ monoor di-carboxylic acids, $C_1$–$C_8$ alkyl esters of $C_8$–$C_{40}$ mono- or di-carboxylic acids and $C_{10}$–$C_{40}$ alcohols.

3. The process of claim 1 wherein step (c) comprises heating said liquid solution to a temperature of about 20°–40° C.

4. The process of claim 1 wherein step (c) comprises heating said liquid solution to a temperature of about 20°–30° C.

5. The process of claim 1 wherein the pressure in step (c) is greater than atmospheric pressure.

6. The process of claim 1 further comprising:
 (d) compressing portions of said mixture into a plurality of discrete pellets before step (a).

7. The process of claim 6 wherein said pellets have an average sieve size of less than about 1 inch.

8. The process of claim 1 wherein said filter medium comprises diatomaceous earth.

9. The process of claim 1 wherein said filter medium comprises particles having an average size of about 1–30 microns.

10. A process for separating oil from a mixture comprising solid particles and oil, said process being characterized by absence of addition of any hydrocarbon solvent to the mixture and comprising:
 (a) compressing into a plurality of discrete pellets a mixture comprising solid particles and oil, said pellets having an average size of less than about one inch;
 (b) extracting oil from said pellets with a solvent comprising liquid or supercritical $CO_2$, thereby to form a liquid solution comprising oil and liquid or supercritical $CO_2$;
 (c) separating said liquid solution from said pellets; and
 (d) separating $CO_2$ from said liquid solution by evaporating $CO_2$ gas therefrom at a temperature not greater than 60° C. and at a pressure of about atmospheric pressure or greater, whereby said liquid solution comprises oil undiluted by any hydrocarbon solvent.

11. The process of claim 10 wherein step (d) comprises heating said liquid solution to a temperature of about 20°–60° C.

12. The process of claim 10 wherein step (d) comprises heating said liquid solution to a temperature of about 20°–40° C.

13. The process of claim 10 wherein step (d) comprises heating said liquid solution to a temperature of about 20°–30° C.

14. The process of claim 10 wherein said mixture further comprises at least one oil additive selected from the group consisting of alkanolamines, $C_8$–$C_{40}$ mono- or di-carboxylic acids, $C_1$–$C_8$ alkyl esters of $C_8$–$C_{40}$ mono- or di-carboxylic acids and $C_{10}$–$C_{40}$ alcohols.

15. The process of claim 10 wherein said mixture further comprises metal oxide particles and metal particles.

16. The process of claim 10 wherein said liquid or supercritical $CO_2$ has a volume at least about 30 times that of said oil.

17. The process of claim 10 wherein said liquid or supercritical $CO_2$ has a volume about 50–100 times that of said oil.

* * * * *